July 11, 1939.  H. LENTZ  2,165,755
IDLE-RUNNING AND STARTING DEVICE FOR POPPET
VALVE GEARED STEAM LOCOMOTIVES
Filed April 19, 1937  6 Sheets-Sheet 6
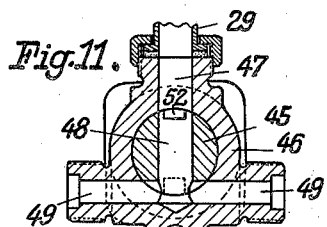
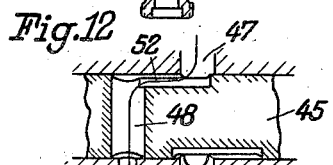
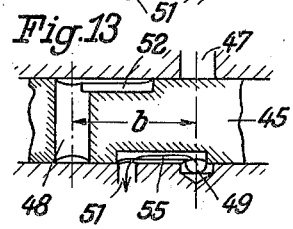
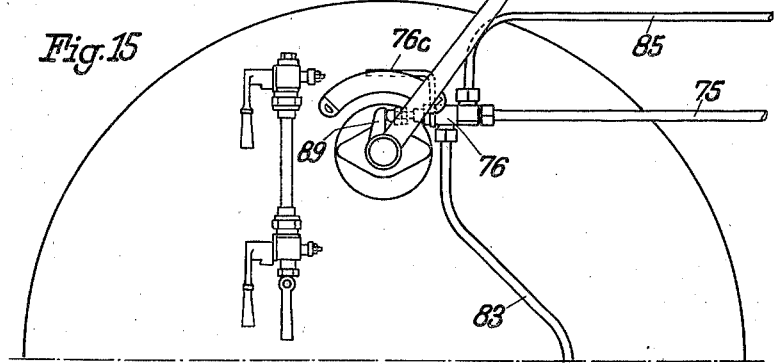
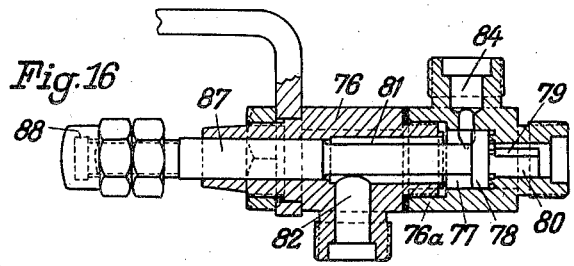
Inventor:

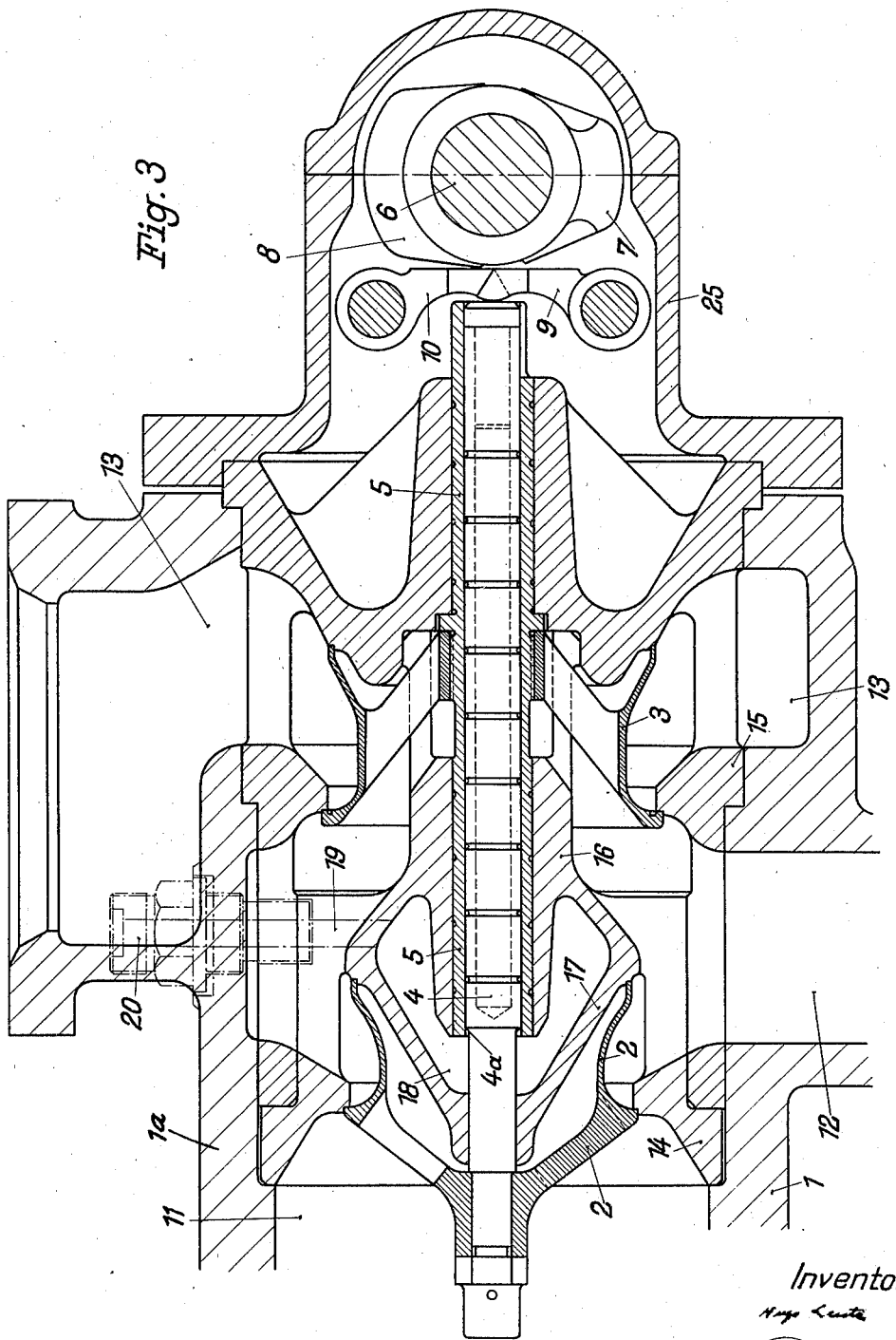

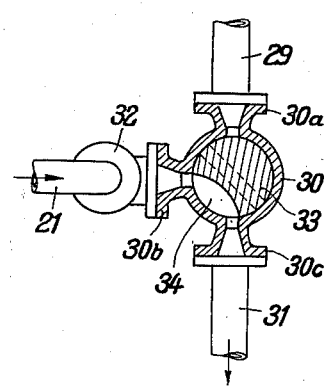
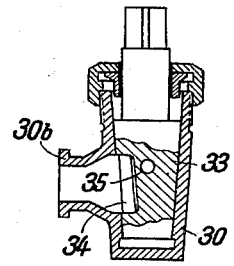
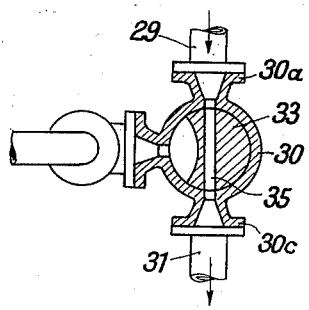
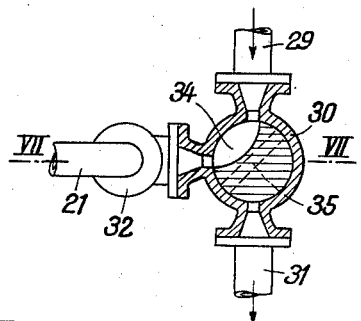
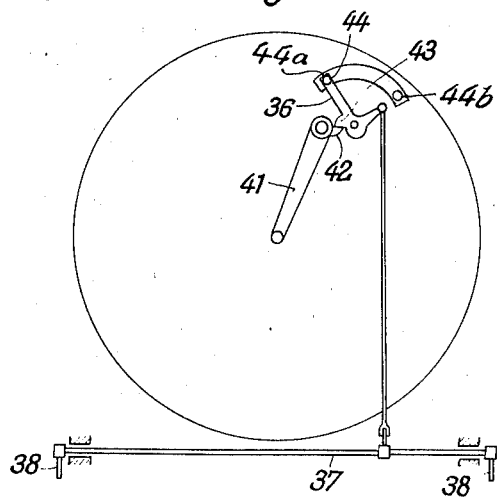

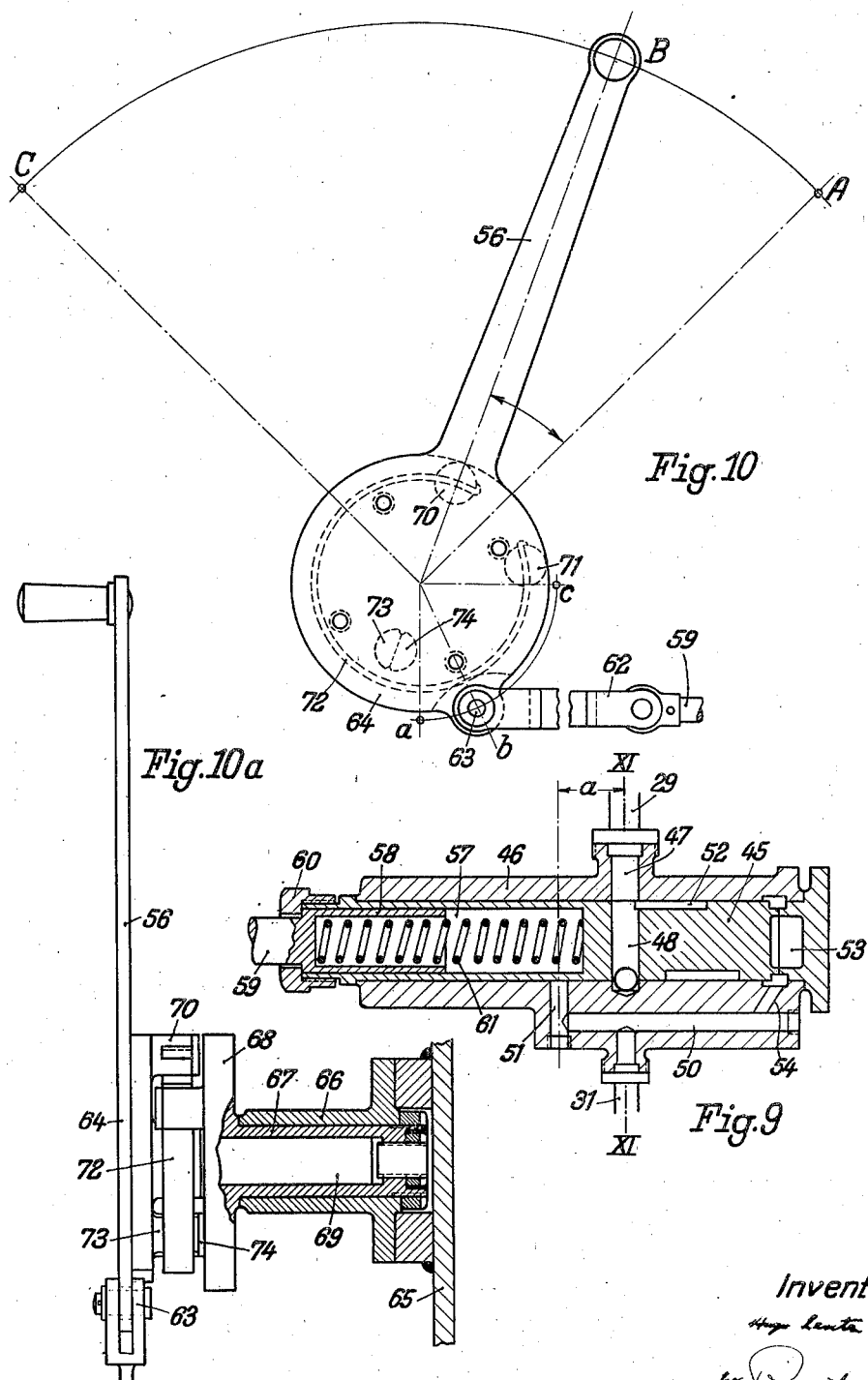

Patented July 11, 1939

2,165,755

UNITED STATES PATENT OFFICE 2,165,755

IDLE-RUNNING AND STARTING DEVICE FOR POPPET VALVE GEARED STEAM LOCOMOTIVES

Hugo Lentz, Berlin, Germany

Application April 19, 1937, Serial No. 137,832
In Germany March 25, 1937

8 Claims. (Cl. 121—127)

This invention relates to an idle-running and starting device for locomotives, the engines of which are equipped with a poppet valve gear. For this purpose an admission valve and an exhaust valve are arranged at each end of the cylinders which valves control the steam feed to the cylinders and the steam exhaust from the cylinders and are opened and closed in known manner by cams mounted on a cam shaft. The poppet valves are closed by a pressure medium, such as steam or compressed air acting on the ends of the valve spindles.

When the locomotive is travelling on a downward gradient or running idle, the steam feed to the steam cylinders is shut off by the throttle mounted on the dome. Furthermore, the feed of the pressure medium acting on the valve spindles is also interrupted. The valves are forced into their open positions by the control cams which are still driven during idle-running and remain in this position owing to the lack of a closing pressure acting on them. Therefore the two ends of the cylinder are brought into intercommunication by the open valves and a complete equalization of presure is attained.

During the transition from idle-running to normal service care has to be taken that the valve spindles come under the influence of the pressure medium before the throttle valve is again opened, as otherwise wobbling of the admission valves may easily occur. If steam is employed as pressure medium for closing the poppet valves, it can easily happen, during the idle-running when the steam admissions are shut off, that condensation water collects in these conduits. Care has therefore to be taken, that prior to the readmission of the pressure medium in the form of steam to the valve spindles, the feed conduits are first freed from water.

The invention sets out to provide on locomotives with poppet valve gears an arrangement which, by simple means and prior to the admission of the pressure medium frees from water the conduits for the medium and frees from pressure the chambers in which the pressure medium acts upon the valve spindles, by communication with the atmosphere. This arrangement can further be brought into dependency of the lever controlling the above mentioned throttle valve so that the pressure medium is conducted to the closing pressure chambers of the valves before the throttle valve and therefore the steam admission to the engine are opened.

Different embodiments of the invention are illustrated, by way of example, in the accompanying drawings in which:—

Fig. 3 is a section on line III—III of Fig. 2 through one end of the gear housing.

Figs. 4 to 6 show in cross section an element controlling the closing steam in the form of a three-way-cock, the plug being in different positions.

Fig. 7 is a longitudinal section through the three-way-cock on line VII—VII of Fig. 6.

Fig. 8 shows diagrammatically an end view of the rear boiler wall with the regulator lever and the closing pressure lever and with one part of the transmission rod system.

Fig. 9 shows in section a second form of construction of an idle-running and starting device, dependent on the regulator lever and in form of a slide valve.

Fig. 10 shows in side elevation how the lever for the throttle valve is connected with the slide valve.

Fig. 10a shows partly in section the bearing of the lever for the throttle valve.

Fig. 11 is a section through the distribution slide valve on line XI—XI of Fig. 9.

Figs. 12 and 13 show two other positions of the distributing slide valve.

Fig. 14 shows diagrammatically the arrangement of the distribution slide valve on the locomotive and the pipe conduits for the closing pressure medium.

Fig. 15 shows in rear view the boiler with a distribution slide valve for compressed air mounted thereon.

Fig. 16 is a longitudinal section through the compressed air control valve.

Fig. 17 shows diagrammatically the connection of the compressed air conduit with the distribution aggregate of the steam cylinder.

Figure 1:
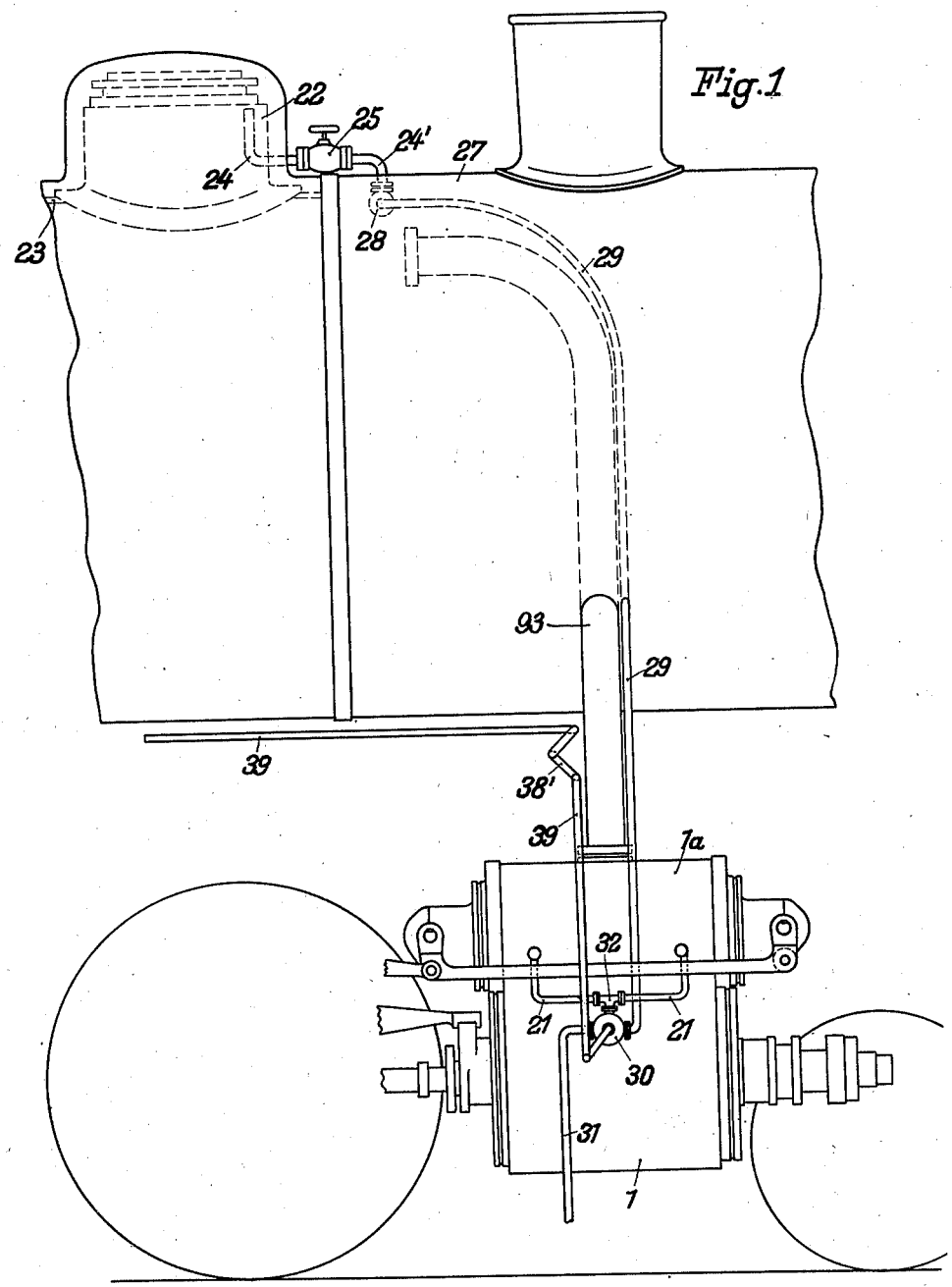
Fig. 1 shows the front part of a locomotive in side elevation, only those arrangements being illustrated which relate to the present invention.
Figure 2:
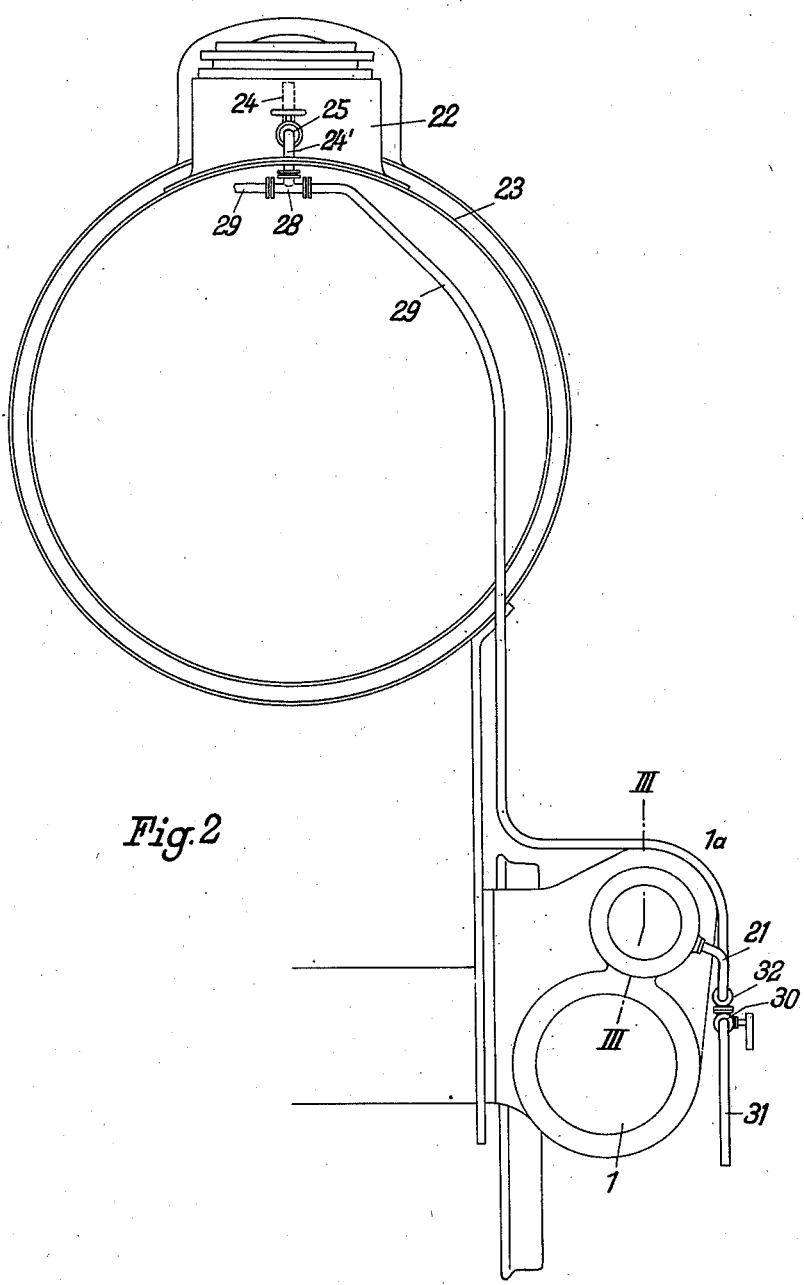
Fig. 2 is a corresponding end view of one half of the locomotive.

A cylinder 1 of the steam engine has a casing 1a extending parallel to the axis of the cylinder and in which in continuous cylindrical chamber valve gear aggregates are mounted, one at each cylinder end, said aggregates consisting of two insert bodies 14 and 15 with an admission valve 2 and an exhaust valve 3 in the same, said valves being actuated by a cam gear acting upon the valve spindles 4 or 5 respectively mounted the one in the other. The cam gear consists in the present instance of an admission cam 7 keyed on a shaft 6 and of an exhaust cam 8, keyed on the same shaft. During the oscillating movement these cams roll on the lower surfaces of intermediate levers 9 and 10. The end of the exhaust intermediate lever 10 engages fork-shaped the end of the admission intermediate lever 9, so that both ends can act upon the ends of the valve spindles mounted the one in the other. The admission valve 2 controls the steam admission from the live steam chamber 11 to the channel 12, leading to the end of the cylinder and the exhaust valve 3 controls the steam discharge from the channel 12 to the exhaust connection 13.

The valves are held on their seats by a fluid pressure medium such as steam. With this object in view the valve cage 14 for the admission valve 2 is constructed as a hollow body 17, the inner space 18 of which communicates through bores 19 in the valve cage 14 and in the insert body 15 and through a screw connection 20 screwed into the bore 19, with a steam admission pipe 21.

In this chamber 18 for the closing steam, terminates the hollow exhaust valve spindle 5, so that the steam acts upon the end of the same, whereby the exhaust valve 3 is pressed on its seat. In order that also the admission valve may be closed by steam pressure, the admission valve spindle 4 which extends through the hollow spindle 5 of the exhaust valve 3 is reduced in diameter within the hollow space 18. The steam can therefore act upon the free annular face 4a which is of such dimension that the closing steam presses the admission valve 2 onto its seat when the steam admission is shut off. During the operation the steam pressure acting in the live steam chamber 11 acts also for closing of the admission valve 2.

The steam serving for closing the valves is taken from the steam dome 22 of boiler 23 through a steam pipe 24, in which a stop valve 25 is mounted. A pipe 24' leads from this stop valve 25 to a cross union 28 arranged in the smoke channel 27. Two pipes 29 branch off from the cross union, the one of which leading to the right hand and the other one to the left hand steam cylinder of the locomotive. These pipes are each connected at the side of the cylinder to a three-way-cock 30.

The housing of the three-way-cock 30 has three unions 30a, 30b and 30c of which the union 30a is connected with the pipe 29 coming from the boiler and the opposite union 30c is connected with a pipe 31 opening into the atmosphere. The third union 30b, i. e. the middle one, is connected with a cross union 32 from which two pipes 21 branch off. Each of these pipes 21 is connected with a union 20 mounted on the valve housing 1a and establishes the connection with the closing steam chamber 18 of the corresponding control group.

The plug 33 of the three-way-cock has a recess 34 in its circumference, which in the position shown in Fig. 4 connects the cross union 32 and thereby the pipes 21 with the steam outlet conduit 31. This corresponds to the idle running position of the engine in which the closing steam chambers 18 are without pressure and the valves remain consequently in their open position.

If the cock plug 33 is turned through 45° into the position shown in Fig. 5, the bore 35 in the plug establishes a communication between the steam admission pipe 29 and the steam outlet conduit 31. In this position the boiler steam is discharged into the atmosphere and thereby removes the condensation water which had collected in the conduits during the idle running.

If the plug is then brought into the position shown in Fig. 6 the recess 34 connects the steam admission pipe 29 with the conduits 21 leading to the closing steam chambers 18. These chambers are then under steam pressure, which acts upon the valve spindles and moves the valves back onto their seats.

Adjusting of the cock plugs is effected by a lever 36 arranged on the cab and which, by a rod system, rotates a transverse shaft 37 mounted on the frame from which shaft through the intermediary of arms 38 and angle levers 38' and rods 39 connected therewith, the plugs 33 are adjusted (Figs. 1 and 8).

The live steam is taken from the steam dome through a throttle valve which is actuated by a lever arranged in the cab. This steam passes from the throttle valve through a pipe conduit to a superheater and thence through a pipe conduit 93 to the steam cylinder. This is the usual arrangement which is well known and is consequently not shown on the drawings.

In order to prevent opening of the throttle valve before the closing steam presses the valves onto their seats, an arrangement may be provided between the adjusting lever 36 and lever 41 of the throttle valve which locks the throttle valve lever in its closing position until the adjusting lever 36 has been brought into the position in which the closing pressure becomes effective. This can be done for instance thereby that on the hubs of the two levers projections 42 and 43 are arranged which, when the throttle valve is closed, and the closing steam shut off, engage the one over the other as shown in Fig. 8. In this position the lever 36 is secured by a locking bolt 44 on the lever 36 engaging in a notch 44a of a rack in a well-known manner. The throttle valve lever 41 can therefore be displaced only if the closing pressure lever 36 has been previously moved into the open position, when the locking bolt 44 engages the notch 44b.

In the Figs. 9 to 14 another form of construction of the starting and idle-running device is shown, in which for controlling the closing pressure, a control slide valve is employed adapted to be adjusted from the regulator lever.

The control slide valve 45 replacing the three-way-cock is shiftably mounted in a housing 46 which as diagrammatically shown in Fig. 14 is preferably arranged between the two steam cylinders of the locomotive. A bore 47 terminates in the slide valve bore of the casing and a tube 29 coming from the steam dome is connected to bore 47. The slide valve 45 has a bore 48 which in the position shown in Fig. 9 communicates with bores 49, laterally arranged in the housing 46, a cross piece 32 being connected with each of these bores 49. Tubes 21 extend one from each of these cross pieces to the union 20 which establishes a connection to the closing steam chamber 18 of the corresponding poppet valve aggregate arranged on each end of the cylinders. In this position of the slide valve gear 45 steam can flow to the closing steam chambers 18 and put the valve spindles under pressure.

To free from water the steam pipes when the throttle valve is closed and to ventilate the chambers 18, a longitudinal bore 50 is arranged in the lower portion of the housing 46 and a tube 31 terminating in the open air is connected to this bore. A bore 51 directed towards the slide valve 45 and adapted to be brought into alignment of bore 48 by shifting of the slide valve 45 by the distance a communicates with the longitudinal bore 50. The bore 48 communicates with bore 47 by a longitudinal passage 52. In this position of the slide valve 45 (Fig. 12) the steam supply pipe 29 is connected with tube 31 terminating in the open air. The condensation water, which might have collected in the steam supply pipe is thereby blown out. In this position of the slide valve the space 53 behind the slide valve communicates through a channel 54 with a longitudinal bore 50 so that condensation water may also flow off from here.

If, however, the slide valve is shifted from the initial position by the distance b (Fig. 13) the steam pipe 29 is shut off. The bores 49 to which the closing steam chambers 18 of the poppet valve aggregates are connected, communicates in this instance with the discharge pipe 31 by a longitudinal groove 55 in the slide valve 45, so that the closing steam chambers 18 are ventilated.

The adjusting of the slide valve 45 is dependent on the adjusting of the throttle valve lever 56 in such a manner that during the adjusting of the throttle valve lever from B to C, the throttle valve is brought from the closing position into its maximum open position and the slide valve remains, during this adjusting, in the position shown in Fig. 9. If, however, the throttle valve lever is pushed from B to A or inversely, the throttle valve remains closed, whereas the slide valve moves up to the position shown in Fig. 13 and back. To attain this, the following arrangement is for instance made:—

The piston like end 58 of a set rod 59 is shiftably mounted in a bore 57 of the slide valve 45. This bore 57 is shut off by a cap nut 60, which forms at the same time an abutment for the piston 58. A spiral spring 61 in bore 57 bears at the one end against the cylinder 45 and supports at the other end the piston 58 and pushes the same against the cap nut 60.

The set rod 59 is connected with a hinge point 63 of the hub disc 64 of the throttle valve lever 56 by means of a rod system 62. A bearing 66 fixed on wall 65 of the locomotive serves for journalling the throttle valve lever, a bush 67 being rotatably inserted into said bearing 66 and carries a disc 68 opposite the hub disc 64 of the same size as this. The pivot pin 69 of the throttle valve lever 56 is mounted in bush 67. A pin 70 projecting from the hub disc 64 and a pin 71 on disc 68 carry the end of a ring shaped tension spring 72, which tends to mutually turn the two discs. Slackening of spring 72 is however prevented by abutments 73 and 74, fixed the one on the hub disc 64 and the other on disc 68. If the two abutments come into contact the one with the other the throttle valve lever 56 and the slide valve 45 assume the positions shown in Figs. 9 and 10, in which the throttle valve is just shut off, the closing pressure steam being however not yet admitted. If the throttle valve is opened by oscillation of lever 56 from the position B into the position C, the abutment 73 moves along the abutment 72 and thereby rotates disc 68 from which then the adjusting of the throttle valve is effected in a suitable manner. During this adjusting the slide valve 45 for the closing pressure remains uninfluenced, as during the displacement of the pivot point 63 from the position b to c, the piston 58 compresses the spring 61 and thereby assists also the tight shutting off of the slide valve.

If, however, the throttle valve lever 56 is moved from B to A the abutment 73 is lifted off the abutment 74 and the annular spring 72 is tensioned. During this adjusting, the pivot point 63 moves from b to a. The piston 58 thereby moves the cap nut 60 and by the same the slide valve 45 and establishes successively the connections shown in Figs. 12 and 13, which effect the freeing from water of the closing steam conduit and the ventilation of the closing steam chambers.

If the throttle valve lever 56 is shifted from A to B, the closing steam chambers 18 are first put under steam pressure and only then, during the further adjusting of the throttle valve lever from B to C, the steam is admitted to the cylinders.

In Figs. 15 to 17 another form of construction of the idle-running and starting device is shown, in which the valves lifted by the cam fingers are returned by compressed air onto their seats. The compressed air is then taken by a tube 75 from the container of the locomotive for compressed air, which is not illustrated. The tube 75 is connected to a gear casing, which consists of two parts 76 and 76a screwed the one onto the other. The casing part 76 is mounted on an angle piece 76c fixed on the end wall of the boiler. A distribution chamber 77 is arranged between the two casing parts and a distribution piston 78 is shiftably mounted in this chamber. The portion of chamber 77 at the right of piston 78 communicates by means of recesses 79 in the journal 80 with the pipe 75 for compressed air. The portion of the chamber situated on the other side of the piston is connected by an annular passage 81 and by a transverse bore 82 with a pipe 83 connected with the casing and terminating in the atmosphere. The piston 78 controls a channel 84, from which a compressed air pipe 85 leads to the chamber 18.

The piston 78 is adjusted from the throttle valve lever 86. With this object in view the piston rod 87 extends through the part 76 of the casing and carries at its end an adjustable nut 88, serving as stop, against which the end of an arm 89 comes to bear, which is mounted on the throttle valve lever 86.

In the position shown in Fig. 15 of the throttle valve lever 86, the throttle valve is closed, i. e. the steam admission to the engine is shut off. In this position arm 89 presses the piston 78 to the right (Fig. 16). The pipe 85 is thereby connected with the ventilation conduit 83 so that the closing pressure chambers 18, in which the compressed air acts upon the valve spindles, are then no longer under pressure.

If the throttle valve lever 86 is oscillated to the left, that is the throttle valve opened, the arm 89 liberates the piston rod 87 already at the beginning of its adjusting movement. The air under pressure flowing in through pipe 75 presses the piston 78 towards the left whereby the desaerating pipe is shut off, the pipe 75 for air under pressure, being however connected with the pipe 85.

In order to close by compressed air all valves of both locomotive steam engines from the pipe 85 for compressed air, this pipe 85 is at first connected with the distributing piece 90 arranged in proximity of one of the cylinder ends. This distributing piece communicates through a conduit 91 with a cross piece 92, arranged near the other cylinder end. From the distributing piece 90 and the cross piece 92 the pipes 21 branch, which lead to the closing pressure chambers 18.

Also in this instance all valves of the two steam engines are submitted to closing pressure from the throttle valve lever through the intermediary of the distributing piston 78, before the steam arrives at the engine.

I claim:—

1. An idle-running and starting device for steam locomotives with poppet valve gear, comprising in combination with an engine cylinder, a housing extending parallel to said cylinder, two poppet valve aggregates in said housing one at each end of said cylinder, each aggregate comprising an admission valve and an exhaust valve, two spindles one slidable within the other and each spindle carrying one of said valves, a cam gear cooperating with said spindles to open said valves, closing pressure chambers surrounding said spindles, a source of pressure, conduit leading from said source of pressure to said chambers and adapted to supply pressure medium to said chambers to close said valves, and a control element in said conduit having passages adapted in one position to establish communication between said chambers and the atmosphere and in a second position between said chambers and said source of pressure.

2. An idle-running and starting device as specified in claim 1, in which the source of pressure consists of the steam space of the locomotive boiler, and the control element is connected with this space.

3. In an idle-running and starting device as specified in claim 1, a throttle valve, a control lever for said throttle valve, and adjusting elements cooperatively connecting said throttle valve control lever and the closing pressure control element to establish communication between the closing pressure chambers and the source of pressure before the opening of said throttle valve by said lever.

4. In an idle-running and starting device as specified in claim 1, the source of pressure consisting of a compressed air container, a pipe conduit connecting the control element with said container, a throttle valve for the steam supply to the cylinder, a control lever for said throttle valve, an arm on said lever cooperatively connected with said control element to set said control element to close said pipe conduit and connect the closing pressure chambers with the atmosphere when said throttle valve is closed.

5. In an idle-running and starting device as specified in claim 1, an operative lever arranged in the locomotive cab, transmission means between said lever and the control element, locking members on said control lever, a throttle valve for the steam supply to the cylinders, a lever controlling said throttle valve, locking members on said throttle valve lever in cooperative connection with said operative lever to lock said throttle valve lever in closed position until communication is established between the closing pressure chambers and the source of pressure by said control element.

6. In an idle-running and starting device as specified in claim 1, a throttle valve for the steam supply to the cylinders, a lever controlling said throttle valve, a transmission rod system between said throttle valve lever and the control element, an idle motion member in said system adapted to interrupt the transmission between said throttle valve lever and said control element during the displacement of said throttle valve lever from its closed position into its opening position.

7. In an idle-running and starting device as specified in claim 1, a throttle valve for the steam supply to the cylinders, a lever controlling said throttle valve, a transmission rod system between said throttle valve lever and the control element, an idle motion member in said system adapted to interrupt the transmission between said throttle valve lever and said control element during the displacement of said throttle valve lever from its closed position into its opening position, and a spring influenced coupling between the throttle valve and throttle valve lever adapted when said throttle valve is closed to allow the throttle lever to move past its closed position to adjust said control element.

8. In an idle-running and starting device as specified in claim 1, in which the control element consists of a slide valve having a bore, a throttle valve for the supply of steam to the cylinder, a lever controlling said throttle valve, a rod system connecting said throttle valve lever to said slide valve, a piston connected to said system and reciprocable in said bore, a nut closing said bore and forming an abutment for said piston and a spring pressing said piston against said nut.

HUGO LENTZ.